Feb. 1, 1966 R. SPURR ETAL 3,232,446
ARTICLE TRANSFER MECHANISM
Filed Dec. 17, 1962 7 Sheets-Sheet 1

FIG_1

INVENTORS
ROBERT SPURR
VOLKER R. GRUNDMANN
BY Burns, Doane, Benedict, Swecker and Mathis
ATTORNEYS

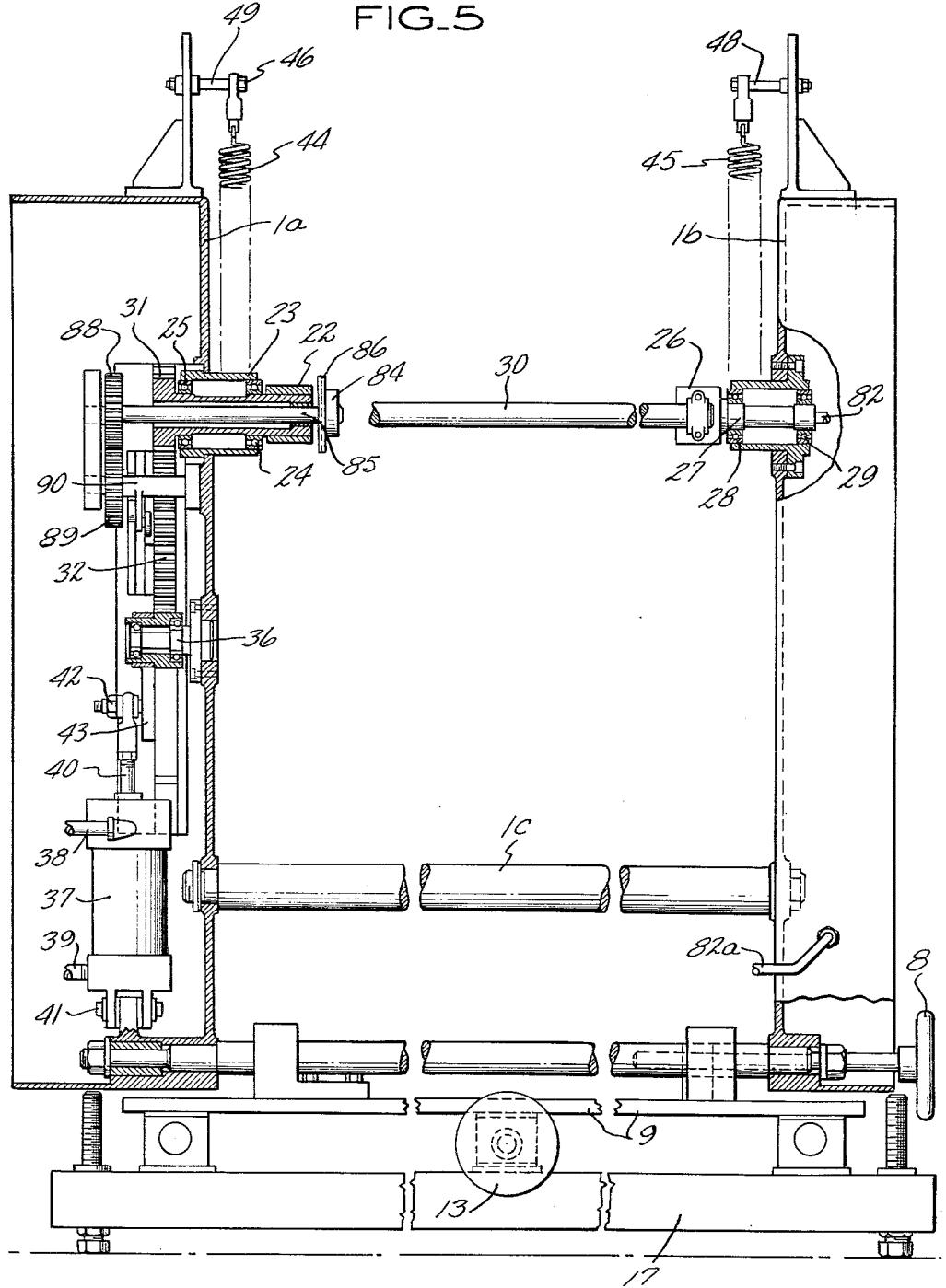

Feb. 1, 1966  R. SPURR ETAL  3,232,446
ARTICLE TRANSFER MECHANISM
Filed Dec. 17, 1962  7 Sheets-Sheet 4
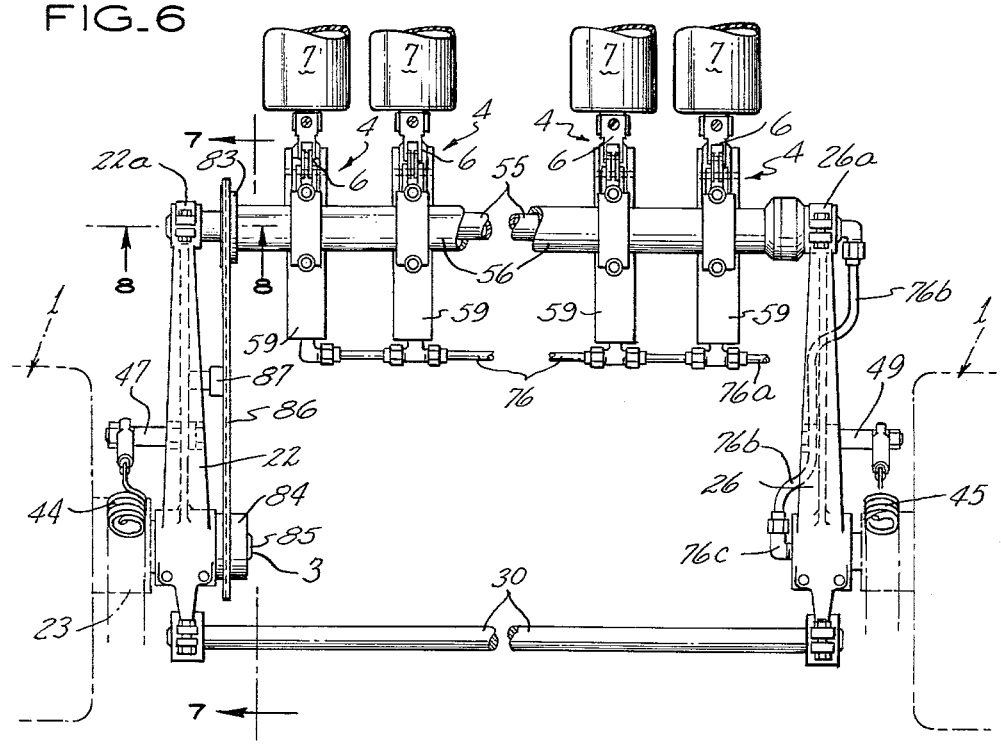
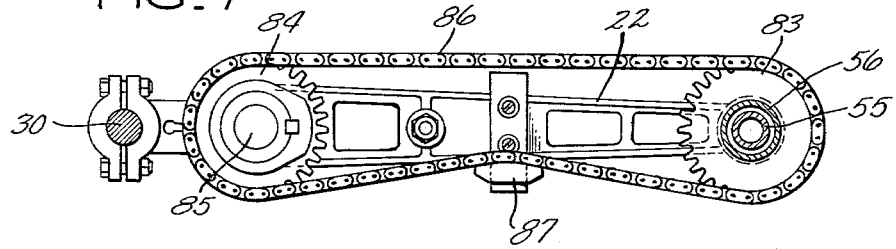
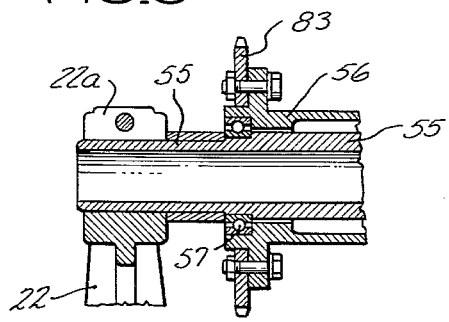

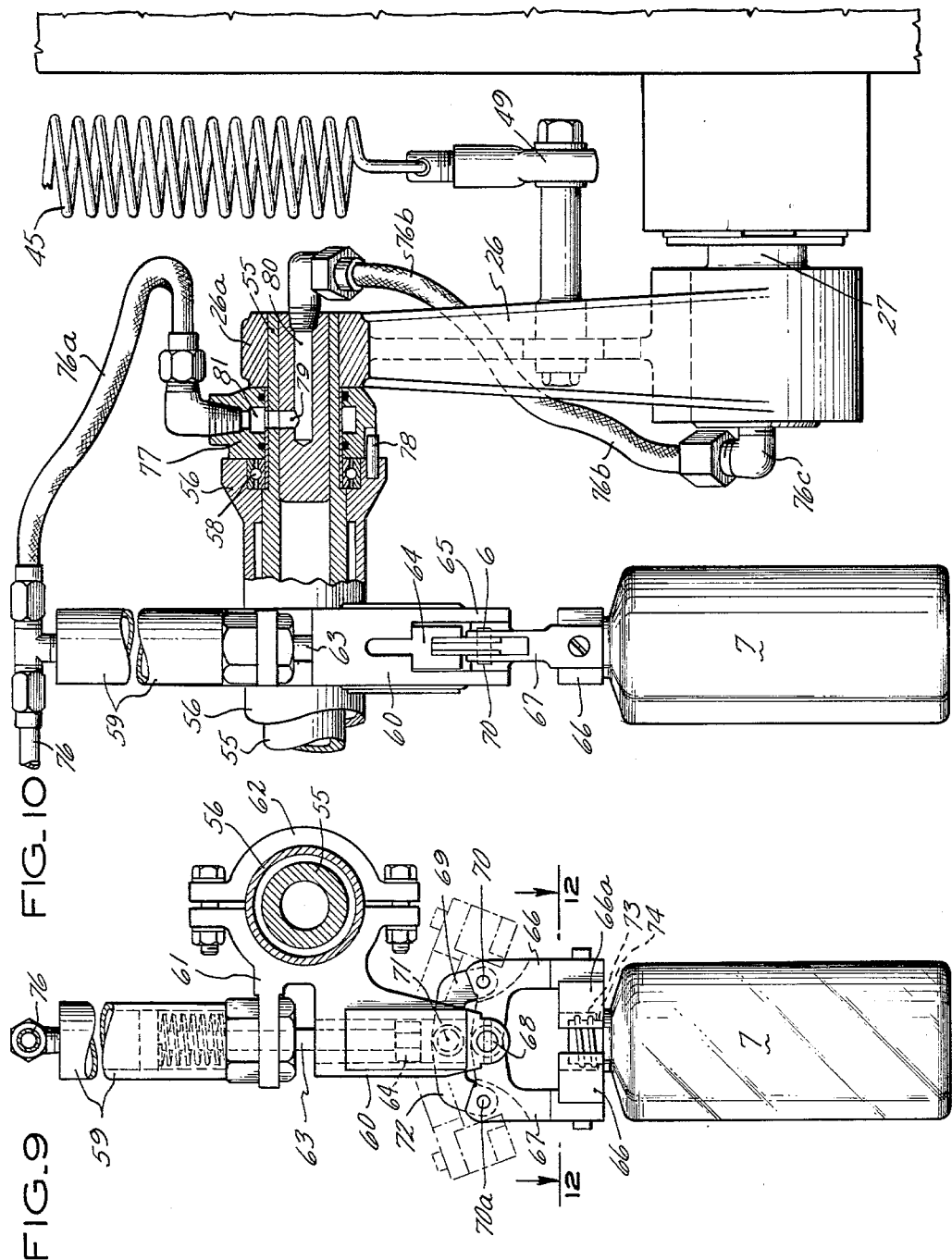

Feb. 1, 1966 R. SPURR ETAL 3,232,446
ARTICLE TRANSFER MECHANISM
Filed Dec. 17, 1962 7 Sheets-Sheet 6
FIG. 11
FIG. 12
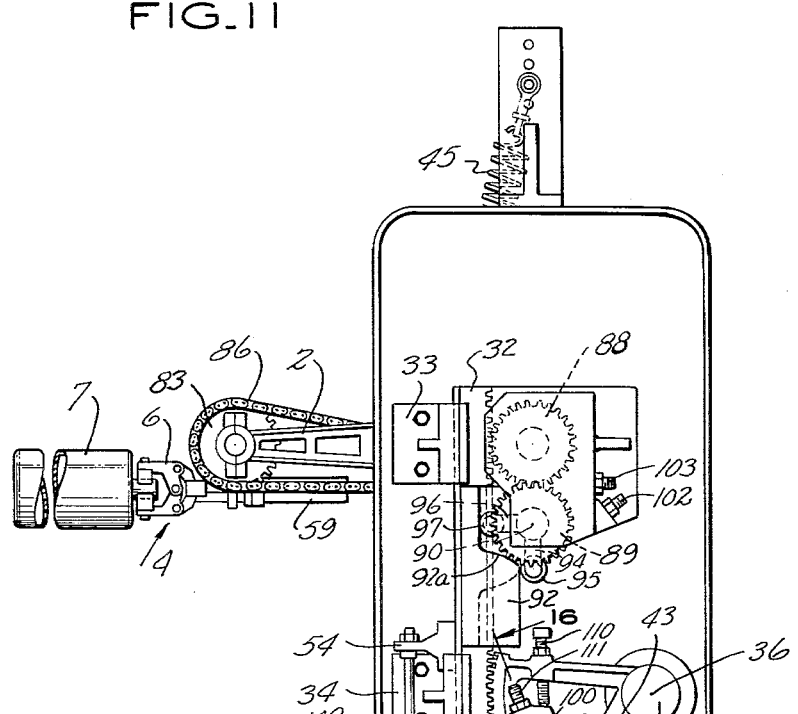
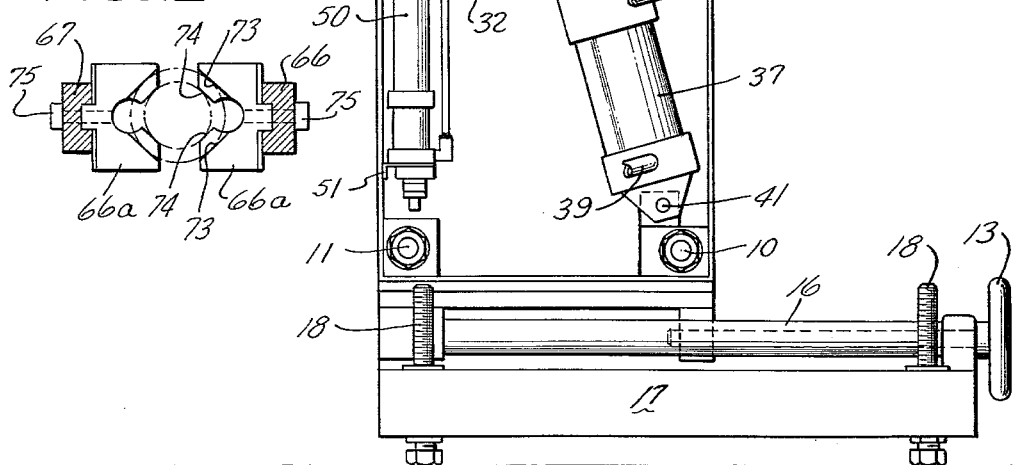

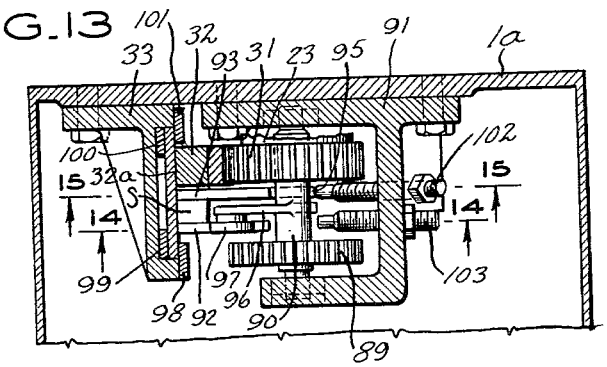
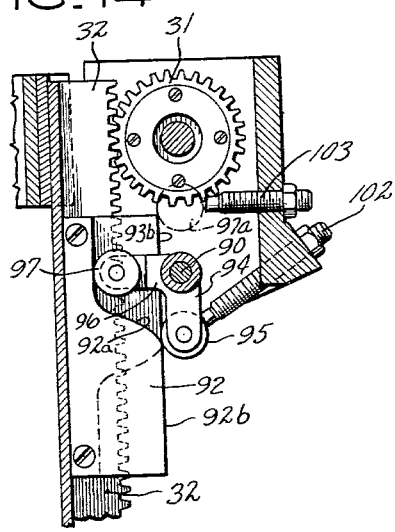
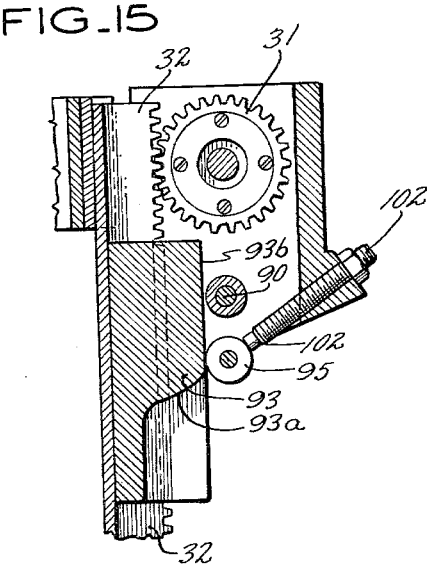
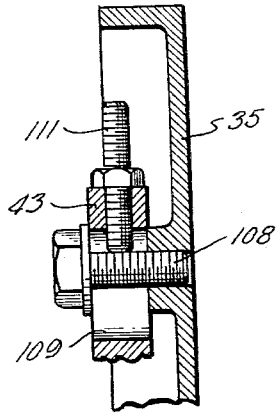
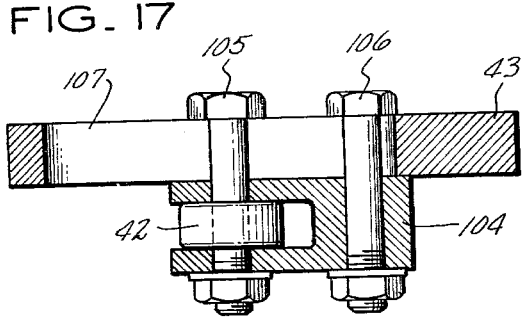

United States Patent Office 3,232,446
Patented Feb. 1, 1966

3,232,446
ARTICLE TRANSFER MECHANISM
Robert Spurr, West Hartford, and Volker R. Grundmann, Windsor, Conn., assignors to Monsanto Company, a corporation of Delaware
Filed Dec. 17, 1962, Ser. No. 245,304
5 Claims. (Cl. 214—1)

This invention pertains to an article transfer mechanism. In particular, it relates to an apparatus for simultaneously moving a plurality of articles through an arcuate path and effecting the reorientation of these articles during an intermediate portion of their swinging movement.

In the handling of articles, such as molded bottles, it is frequently necessary to effect the transfer of bottles from a conveyor where they have a particular orientation to another conveyor where they have a different orientation. In accomplishing the transfer of articles between conveyers, considerable difficulty may be encountered in keeping articles properly aligned in relation to infeed and outfeed conveyors at the beginning and end of the transfer movements. Additional difficulty may result because of reorientation manipulations creating interference between articles being reoriented and portions of a conveyor apparatus or other structures.

In general, it is desirable to incorporate in a transfer mechanism a high degree of structural simplicity so as to minimize fabrication costs and maintenance requirements without sacrificing operational reliability. It is also desirable to minimize the number of operating mechanisms which must be incorporated in an apparatus to effect article transfer and reorientation so as to maintain power requirements at a reasonable level and avoid undue structural complexity.

In the vicinity of infeed and outfeed conveyors it is particularly desirable that there be no possibility of inadvertent article movement which might cause improper positioning of articles on outfeed conveyors, or improper alignment of the article gripping components with articles on infeed conveyors during the pick-up operation.

Where changes are made in the extent of oscillating movement of transfer mechanisms, it is desirable that article reorientation positions remain unchanged so as to avoid the possibility of creating interference between the transfer mechanisms and other apparatus components.

It is also desirable that article reorientation be accomplished within the article width so that multiple articles may be simultaneously handled within a minimum space.

As, during portions of the transfer movement, it is desirable for articles to be maintained in a position either parallel to the initial pick-up position or parallel to a reoriented position, it is desirable that an article reorientation mechanism be provided which is fully compatible and readily adapted to incorporation with a conventional, parallel motion type of transfer mechanism of the type disclosed in United States Rowe Patent 2,623,648.

It is an object of this invention to provide a transfer mechanism which fulfills the requirements delineated above.

A particular object of the invention is to provide a transfer mechanism by means of which the reorientation of an article, during an intermediate portion of the rotating movement of a transfer unit, is accomplished by rotating the article about an axis parallel to the axis of rotation of the transfer unit. In addition, it is intended that during the initial and terminal portions of the rotary movement of the transfer unit, articles are maintained in a position either parallel to their position of original alignment or parallel to their position of reoriented alignment.

A further object of the invention is to provide a transfer apparatus which is readily adapted to incorporation in systems having different conveyer elevations.

An additional object of the invention is to provide a transfer mechanism wherein a single operating means is employed to cause the oscillation of the transfer unit and the reorientation of the article carrying means carried by the transfer unit.

A still further object of the invention is to provide a transfer mechanism including positive means for insuring the desired orientation of article carrying means at the beginning and end of each article transfer movement.

Another object of the invention is to provide a transfer mechanism which is readily adapted to incorporation in conventional, parallel motion type of transfer mechanisms.

Yet another object of the invention is to provide a transfer mechanism wherein changes may be effected in the extent of oscillating movement of the transfer unit without altering the positions where article reorientation occur.

A final object of the invention is to provide an article transfer mechanism which is characterized by structural simplicity and operational reliability and which is particularly adapted to the transfer of multiple articles. It is intended that a plurality of articles may be simultaneously reoriented during a transfer movement such that the width requirement of each article during the transfer operation remains constant.

In accomplishing this invention, a transfer mechanism is employed which includes transfer means mounted for oscillating movement and article carrying means mounted on the transfer means and spaced from the oscillation axis thereof. This article carrying means is mounted for oscillation about an axis parallel to the oscillation axis of the transfer means. Drive means are provided for oscillating the transfer means. First, article position governing means are operably connected with the transfer means and the article carrying means and are adapted to rotate the article carrying means in response to the initial portion of the rotating movement of the transfer means in one direction and in response to the terminal portion of the rotating movement of the transfer means in the opposite direction so as to cause the article carrying means to remain substantially parallel to its initial position. Second, article position governing means operably connect the drive means with the first article position governing means and are adapted to rotate and reorient the article carrying means while the transfer means moves through an intermediate portion of its rotating movement in one direction, and are adapted to counter rotate the article carrying means to restore it from its reoriented position to a position parallel to its initial position while the transfer means moves through an intermediate portion of its rotating movement in the opposite direction. The first, article position governing means is adapted to maintain the article carrying means parallel to its reoriented position for the terminal portion of the rotating movement of the transfer means in one direction and the initial portion of the rotating movement of the transfer means in the opposite direction.

In describing the invention reference will be made to a preferred apparatus embodiment, illustrated in the accompanying drawings. In these drawings:

FIG. 5 is a partially sectioned, front elevational view of the apparatus shown in FIGURE 1, wherein the transfer assembly is disposed in a horizontal orientation and thus not shown;

FIG. 6 is a top, plan view of the apparatus shown in FIGURE 1 with the transfer assembly and article carrying assembly disposed in a generally horizontal, forwardly extending, article pick-up orientation;

FIG. 7 is a sectional view of the parallel motion portion of the transfer assembly component of the mechanism, as viewed along the section line 7—7 of FIGURE 6;

FIG. 8 is a sectional view of a portion of the parallel motion mechanism as viewed along the section line 8—8 of FIGURE 6;

FIG. 9 is an end, elevational view of an article gripping assembly of the mechanism;

FIG. 10 is a fragmentary and partially sectioned view of a portion of the article carrying assembly in the vicinity of its junction with a portion of the transfer assembly, wherein the apparatus is viewed from its right side when disposed as shown in FIGURE 4;

FIG. 11 is an end, elevational view of the apparatus shown in FIGURE 1, wherein a portion of the housing cover has been removed to reveal the details of operating components;

FIG. 12 is a sectional view of the article gripping jaws of the gripping assembly shown in FIGURE 9, as viewed along the section line 12—12 of FIGURE 9;

FIG. 13 is a top, plan view of a cam and cam follower assembly portion of the apparatus, wherein certain components have been removed for purposes of visual clarity;

FIG. 14 is a sectional view of the cam and cam follower assemblies illustrated in FIGURE 13, as viewed along the section line 14—14 of FIGURE 13;

FIG. 15 is a sectional view of the cam and cam follower assemblies of the apparatus as viewed along the section line 15—15 of FIGURE 13;

FIG. 16 is a sectional view of a drive adjusting component of the apparatus as viewed along the section line 16—16 of FIGURE 11; and FIG. 17 is a sectional view of the drive component portion of the apparatus as viewed along the section line 17—17 of FIGURE 11.

Figure 1:
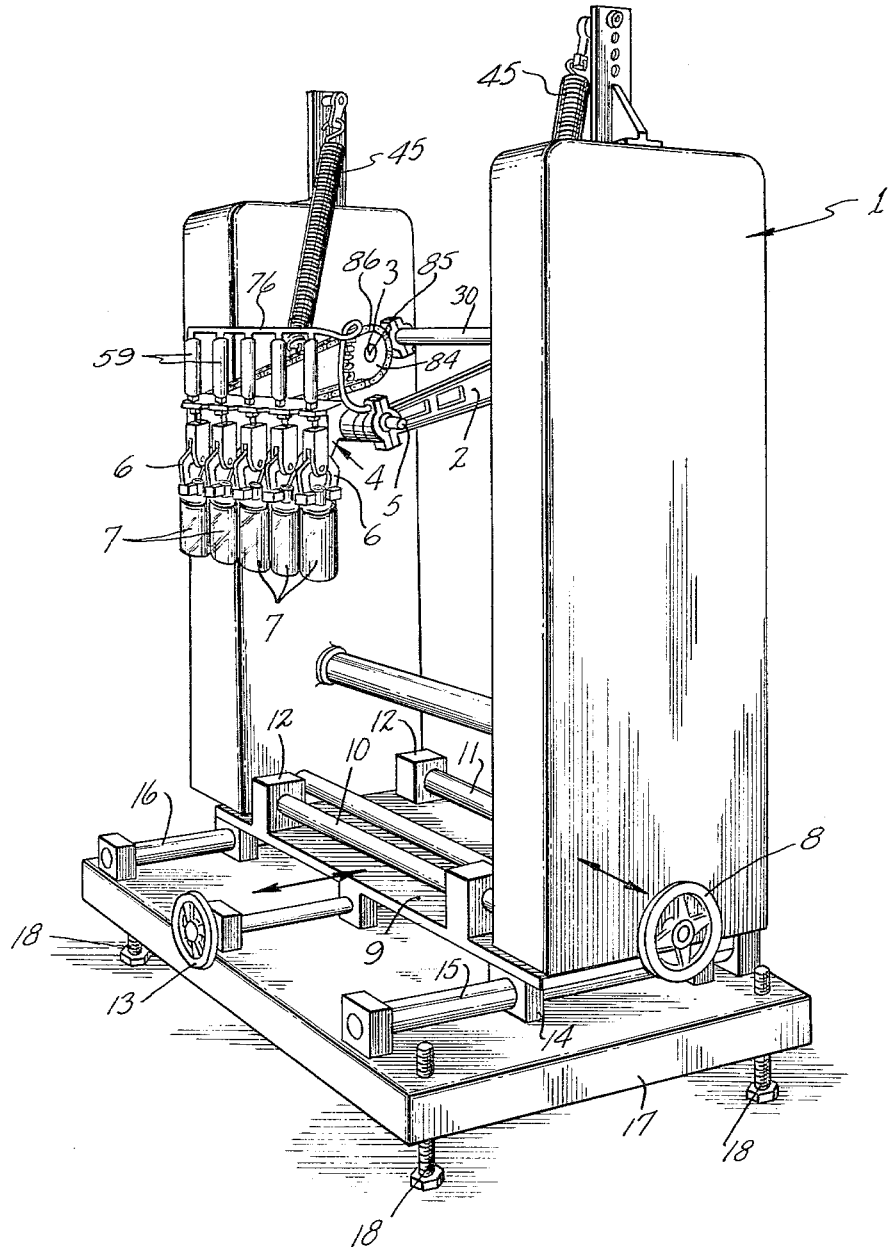
FIG. 1 is a perspective view of the preferred embodiment of the transfer mechanism of this invention.

The preferred embodiment of the transfer mechanism, as shown in FIGURE 1, is mounted in a housing 1. The mechanism is characterized by a transfer arm assembly 2 which is mounted in the housing 1 for oscillation about an axis 3. The transfer arm assembly, at its outermost end, carries an oscillatable, article carrying assembly 4. Article carrying assembly 4 is mounted for oscillation about an axis 5 which is parallel to axis 3. As shown, this assembly 4 includes a plurality of article gripper assemblies 6 which are spaced along the axis 5. Each such gripper assembly 6 is adapted to engage and secure an article, such as a molded bottle 7, during a transfer operation.

The transfer mechanism illustrated in FIGURE 1 is mounted so that it may be adjusted both axially and transversely of the oscillation axis 3. Axial adjustment of the unit is accomplished by manual manipulation of a hand wheel 8 which operates a conventional, threaded rod adjusting mechanism for moving the housing 1 axially with respect to the oscillation axis 3 across a base member 9. Housing 1 is slideably supported on base member 9 by means of rails 10 and 11 which are carried by the housing and which are slideably mounted in upstanding and apertured bracket members 12 disposed at each corner of the base member 9. Adjustment of the housing 1 transversely of the oscillation axis 3 is effected by manipulation of a hand wheel 13 which is connected with another conventional, threaded rod adjusting mechanism, the details of which are not illustrated. Manipulation of hand wheel 13 is effective to move the base member 9 and its supported housing 1 transversely of the oscillation axis 3. By means of apertured and downwardly projecting bracket members 14 disposed on each corner of the under surface of the base member 9, provision is made for mounting the base member 9 on rails 15 and 16, which rails are supported by a primary base member 17 underlying the shiftable base member 9. Vertical adjustment of the mechanism may be accomplished by appropriate manipulation of conventional leveling bolts 18, one of which is disposed at each corner of the base member 17.

As will be appreciated, the mechanisms described for effecting positional adjustments of the housing 1 are conventional in character and comprise no part of the present invention. For this reason, their structural details are not shown.

The transfer mechanism of this invention is designed to transfer articles from one conveyor where they are disposed in one orientation to another conveyer where they are to be disposed in an orientation displaced 90° from their original positions. The general mode of article transfer effected with the present invention is illustrated in FIGURES 2, 3 and 4.

Figure 2:
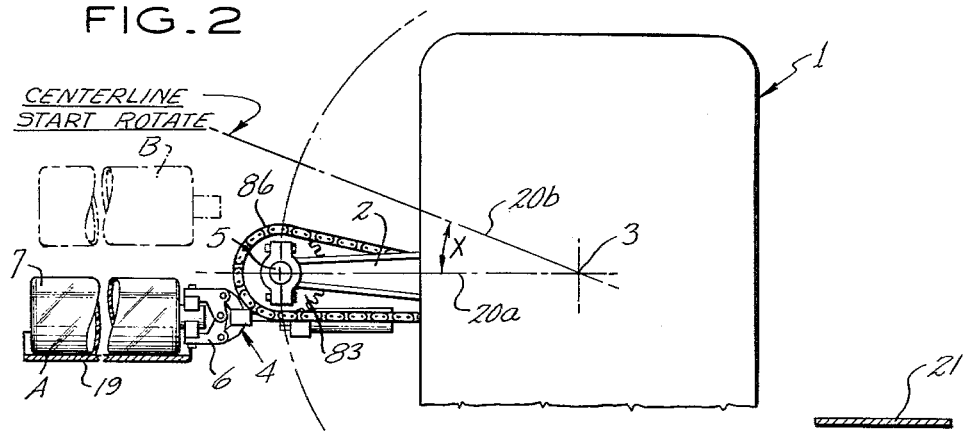
FIGS. 2, 3 and 4 are schematic, end elevational, views of the apparatus illustrated in FIGURE 1, indicating article positions during various phases of the article transfer operations.

As illustrated in FIGURE 2, an article 7, in the form of a conventional bottle, is positioned on an in-feed conveyer 19 with the bottle axis disposed in generally horizontal alignment. The bottle 7, as shown in FIGURE 2, is gripped by a gripper assembly 6 in its initial pick-up position A. While the transfer arm assembly 2 rotates through the initial portion of its swinging movement, the article 7 remains parallel to its initial position A. Thus, when the transfer mechanism has rotated so that its frame axis, which intersects the transfer means oscillation axis 3 and the article carrier oscillation axis 5, has swung from a position 20a through an arc X, the bottle 7 will be disposed in position B with its axis still in horizontal alignment and parallel to the initial article position. At this position the transfer arm frame axis will have assumed the position 20b.

While the transfer arm assembly 2 is moving clockwise through the arc X, as shown in FIGURE 2, the article carrier assembly 4 rotates counterclockwise so as to maintain the horizontal article alignment. The manner in which this rotation is effected will be hereinafter described.

Figure 3:
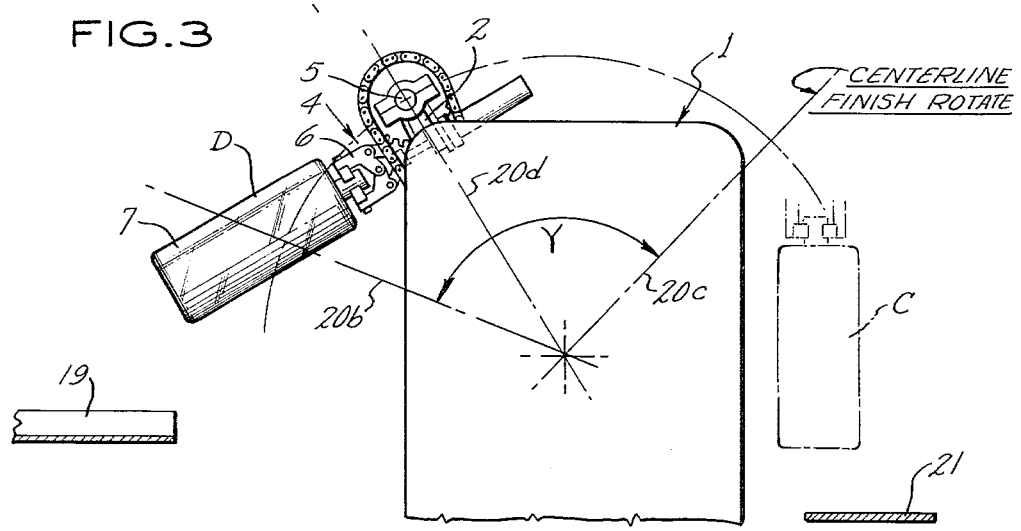
Figure 4:
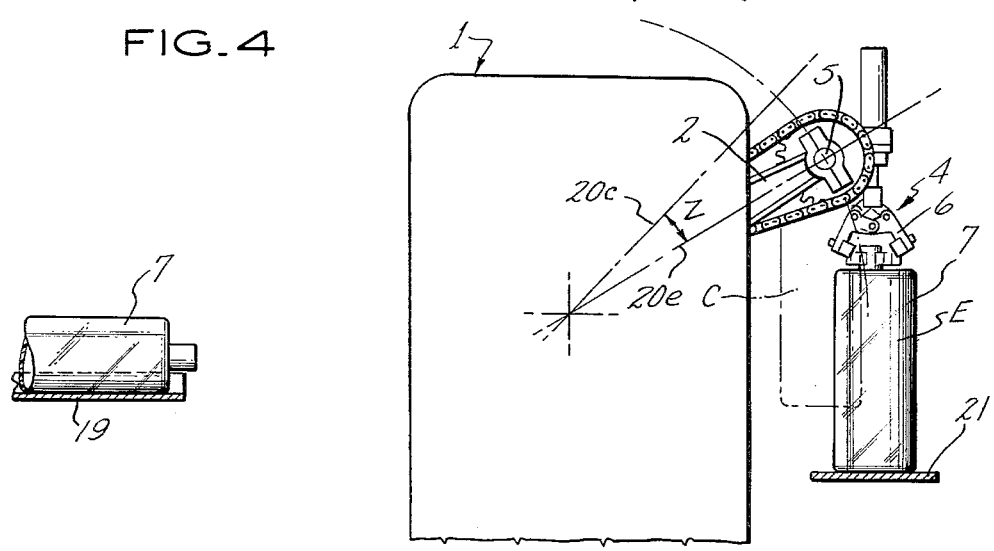

FIGURE 3 illustrates the article reorientation which occurs while the tranfer mechanism moves through an arc Y. This arc represents an intermediate portion of the rotary travel of the transfer arm assembly 2 wherein the frame axis of the assembly moves from a position 20b to a position 20c. During this increment of swinging movement, the article 7 is reoriented from the position shown in FIGURE 2 to an article position C, as shown in FIGURE 3, where its axis is disposed in generally vertical alignment. While the transfer arm assembly 2 moves clockwise through this arc Y, the article carrier assembly 4 rotates counterclockwise at an increased rate so as to cause the gripper assembly 6 supporting the article 7 to rotate and appropriately realign the article 7 from its position of horizontal orientation to its position of vertical orientation. When the transfer mechanism axis is disposed in the position 20d, in an intermediate portion of the arc Y, the bottle 7 is in an intermediate position D reflecting partial reorientation induced by counterclockwise rotation of the gripper assembly 6 about the axis 5.

FIGURE 4 illustrates the terminal portion of the swinging movement of the transfer arm assembly 2, during which terminal portion the article 7 is maintained with its axis in vertical orientation so that the article remains parallel to its reoriented alignment. Thus, while the transfer assembly moves through the terminal arc Z, the bottle moves from position C to position E, maintaining through this movement its vertical orientation. In terminal position E, the article 7 is disposed on an outfeed conveyer 21 where it may be released by the gripper assembly 6 for movement away from the transfer apparatus. During the movement of the transfer assembly through the arc Z, the article carrier assembly 4 including the gripper assembly 6, rotates counterclockwise at the same rate of rotation as occurred in the arc X and at a reduced rate of rotation in relation to the arc Y, so as to maintain the vertical orientation of the article 7.

During the return movement of the transfer arm assembly 2, as shown in FIGURES 2, 3 and 4, i.e. when it moves counterclockwise through the arcs Z, Y and X to restore the transfer assembly frame axis from the position 20e to the position 20a, the gripper assembly 6 rotates clockwise such that, at particular transfer assembly frame axis positions, the orientation of the carrier assembly 4 corresponds to the carrier assembly orientation which it occupies during clockwise movement of the assembly 2.

In summary, during the initial portion of the clockwise swinging movement of the transfer arm assembly 2, as shown in FIGURES 2, 3 and 4, and during the terminal portion of the counterclockwise movement of the transfer arm assembly, through the arc X, the article carrier assembly 4 rotates to maintain a horizontal orientation of the article axis. When the carrier assembly moves through the intermediate arc Y, as shown in FIGURE 3, the carrier assembly is rotated to reorient the article 90°. When the transfer assembly moves through the arc Z, the transfer assembly rotates to maintain the vertical orientation of the article axis. As will be appreciated, the characterizing feature of the mode of article reorientation herein described involves the oscillation of the article carrier assembly 4 about an axis parallel to the axis of oscillation of the transfer assembly 2.

The main structural details of the transfer arm assembly 2 are illustrated in FIGURES 5, 6 and 7.

As shown in FIGURES 5 and 6, the transfer arm assembly 2 includes a transfer arm 22. Transfer arm 22 is rigidly mounted on an axle assembly 23, which is journaled in a portion 1a of the housing 1 by means of bearings 24 and 25. A transfer arm 26 is rigidly mounted on an axle 27 which is journaled in a housing portion 1b by means of bearings 28 and 29. Axles 27 and 23 are coaxial. Arms 22 and 26 are maintained in properly spaced and parallel alignment by means of a connecting bar 30. Proper support for and spacing of wall portions 1a and 1b may be provided for by transverse bracing members such as cross bar 1c.

The mechanism for oscillating the transfer arm assembly is illustrated in FIGURES 5 and 11. This mechanism includes a pinion gear 31, rigidly mounted on the axle 23, and a toothed rack 32 mounted for vertical reciprocation in supporting brackets 33 and 34 and having its toothed periphery meshingly engaged with the teeth of pinion gear 31.

A sector gear 35 is mounted in the housing 1 for oscillation about an axle 36. The toothed periphery of the sector gear 35 meshingly engages the toothed periphery of the rack 32, as illustrated in FIGURE 11.

The operating means for effecting oscillation of the sector gear 35 includes a piston and cylinder assembly 37. The cylinder of assembly 37 is connected by means of conventional conduits 38 and 39 to appropriately controlled sources of fluid pressure. A piston rod 40 extending from a piston within the assembly 37 may be caused to be selectively extended or retracted in an appropriately timed manner as determined by conventional control mechanisms. Assembly 37, as shown, is pivotally mounted at axis 41 so as to be secured to the housing 1. Piston rod 40 is pivotally connected at pivot joint 42 to a drive arm 43, which drive arm, in turn, is clampingly connected with the sector gear 35. The structural nature of the interconnection between the drive arm 43 and the sector gear 35 will be hereinafter described.

When piston rod 40 is extended, the sector gear 35 will be caused to rotate so as to cause the toothed rack 32 to move upwardly and rotate the gear 31 and the transfer arm assembly clockwise, when viewing the apparatus as shown in FIGURE 11. When the piston rod 40 is retracted, the sector gear 35 will cause the rack 32 to move downwardly such that the gear 31 will rotate counterclockwise and effect counterclockwise rotation of the transfer arm assembly 2, when viewing the apparatus as shown in FIGURE 11.

To facilitate the oscillating movement of the transfer arm assembly, overthrow tension coil springs 44 and 45 are provided. Tension spring 44 is pivotally connected at joint 46 to the housing 1 and is pivotally connected at its opposite end to the arm 22 by means of a conventional pivotable connection 47. Spring 45 is connected to housing 1 at one end by means of a conventional, pivotable connection 48 and is connected at its opposite end to the arm 26 by means of a conventional, pivotable connection 49. The function of the springs 44 and 45 is to aid the oscillatory strokes of the arm assembly 2 during the initial part of each swinging stroke and to dampen the final part of each such stroke, in the manner described in United States Rowe Patent 2,623,648.

Further control on the oscillating movement of the transfer arm assembly 2, for the purpose of preventing erratic movement or excessive rates of travel, is provided by a conventional hydraulic snubber 50. Snubber 50 is mounted by means of brackets 51 and 52 in the housing 1. A piston rod 53 extends from the hydraulic snubber 50 to engage a bracket 54 secured to the toothed rack 32. As described in the United States Rowe Patent 2,623,648, the movement of a piston within the snubber 50 is impeded by hydraulic fluid so as to provide a form of dampening action transmitted to the toothed rack 32 by means of the piston rod 53.

The structural details of the article carrying assembly 4 are illustrated in FIGURES 6, 8, 9, 10 and 11.

A shaft 55 is rigidly connected to and extends between the end 22a of the arm 22 and the end 26a of the arm 26. A hollow, cylinder-type shaft 56 is telescoped over the shaft 55 and is mounted for oscillation about the shaft 55 by means of suitable bearings. Such bearings may comprise a roller bearing assembly 57 disposed at the left end of the cylindrical hollow shaft 56 when viewing the apparatus as shown in FIGURES 6 and 8, and a similar roller bearing assembly 58 disposed at the right end of the cylindrical shaft 56 when viewing the apparatus as shown in FIGURES 6 and 10.

As earlier described, a plurality of article gripping assemblies 6 are carried by the carrier assembly 4. Such assemblies are axially spaced and mounted upon the cylindrical and oscillatable shaft 56, as shown in FIGURE 6.

Each assembly 6 includes a fluid actuated piston and cylinder assembly 59 and a pivotable jaw assembly 60. Each piston and cylinder assembly 59 and its associated jaw assembly 60 is mounted upon a frame 61 which is secured to the cylindrical shaft 56 by means of a conventional C-clamp 62.

Each piston and cylinder assembly 59 includes, as shown in FIGURE 9, a piston rod 63 extending from a piston which is spring biased to a retracted position and adapted to be extended by the application of fluid pressure. Piston rod 63 extends to a conventional toggle block 64 which is slideably mounted within a channel 65 formed in the jaw assembly 60 and extending coaxially with the piston rod 63.

At the outermost end of the jaw assembly 60 a pair of jaws 66 and 67 are pivotally mounted at pivot connection 68. An operating link 69 is pivotally connected at pivot point 70 to jaw 66 and is pivotally connected at its opposite end at pivot point 71 to the toggle block 64. Similarly, an operating link 72 is pivotally connected at pivot point 70a to the jaw 67 and pivotally connected at the opposite end at pivot connection 71 to the toggle block 64. With this conventional toggle arrangement, when the piston rod is retracted under the influence of its biasing coil spring, the jaws 66 and 67 are urged to an open, i.e. phantom line position, as shown in FIGURE 9. When fluid is applied to the piston within the cylinder of assembly 59 to effect the extension of the piston rod 63, the jaws 66 and 67 are swung to the closed or article engaging, full line position shown in FIGURE 9.

The manner in which the jaws 66 and 67 engage an article is illustrated in FIGURES 9 and 12.

Where the threaded neck containers are being transferred it may be desirable to provide a jaw configuration by means of which the jaw portions engage the threaded neck portion with surfaces extending parallel to and coaxial with the neck and container axis and wherein other jaw portions engage and support a container neck portion disposed between the container body and the container threaded neck portion. Thus, each jaw may be provided with surface means such as the surfaces 73 formed in the jaw 66 which extend, in the closed jaw position, parallel to the threaded neck portion so as to engage and support the threaded neck portion uniformly along the neck axis. Each jaw may further be provided with a flanged portion at its outer end, such as the illustrated portion 74 or jaw 66, which extends radially inwardly toward the container neck axis to engage a smooth neck portion adjacent the container body and between the container body and the neck threads.

The article neck engaging portions of each jaw may be continuous in character or may comprise a plurality of separated surfaces as illustrated in FIG. 12. These article engaging surfaces may be formed on a detachable jaw portion, such as the portion 66a of the jaw 66, so as to be separable from the jaw for replacement or maintenance purposes. Conventional fastening means such as the threaded member 75 may be employed to secure the removable jaw component to the jaw body.

In order to insure the concurrent operation of the various gripper assemblies 6, there may be provided a manifold, fluid supply arrangement communicating with each of the piston and cylinder assemblies 59 in the manner illustrated in FIGURE 6. Such a common pressurized fluid supply system may entail a conduit 76 communicating with each piston and cylinder assembly 59 by branch conduit portions, as shown. Conduit 76 may include a flexible portion 76a attached to a fitting 77 mounted for oscillating movement about the shaft 55 with the cylindrical shaft 56. Joint movement of the shaft 56 and the fitting 77 may be effected by a connecting pin 78. Shaft 55 may be provided with a circumferentially extending slot 79 which extends to a passage 80 formed in the interior of the shaft 55 as illustrated in FIGURE 10. With this arrangement, an opening 81 in the interior of fitting 77 may provide fluid communication between the passage 80 and the conduit portion 76a in a conventional fashion by maintaining alignment with the slotted portion 79 during the oscillating movement of the shaft 56.

By means of a flexible conduit portion 76b, which extends from the passage 80 to a conduit portion 76c passing through the shaft 27 to a conventional swivel joint 82, the details of which are not illustrated, provision is made for passing fluidized pressure to the piston and cylinder assemblies 59 without excessive conduit flexing during the oscillation of the transfer mechanism components. Swived joint 82, through appropriate but unillustrated conduit connections, may extend to a pressurized fluid supply conduit 82a illustrated in FIGURE 5.

With the arrangement described, it will be appreciated that when fluid pressure is supplied to the conduit 82 by means of conventional valve mechanisms, the operation of which is controlled by conventional control mechanisms, the jaw assemblies 60 will be concurrently actuated so as to effect the concurrent gripping or releasing of a plurality of articles 7.

In order to maintain the carrier assembly 4 parallel to its initial position while it moves through the arc X, in either forward or reverse directions, and to maintain the article carrier assembly 4 in its reoriented position while it moves through the arc Y, in either forward or reverse directions, there is employed a parallel motion mechanism of the general type disclosed in the Rowe Patent 2,623,648. This mechanism, as illustrated in FIGURES 6, 7, 8 and 11, include a sprocket wheel 83 mounted for oscillation about the shaft 55 of the transfer arm assembly and rigidly connected with the oscillatable, cylindrical shaft 56. A second sprocket wheel 84 is mounted upon a shaft 85 which is journaled for oscillation within the shaft 23 as shown in FIGURE 5. As illustrated, shafts 84 and 23 are coaxially related.

An endless sprocket chain 86 extends between and connects the sprocket wheels 83 and 84 in the manner shown in FIGURES 6 and 7. In order to insure proper tautness in this connecting mechanism a conventional chain tightener block 87 may be employed which bears against the outer surface of one flight of the chain 86 to urge it inwardly and remove any slack.

In a manner which will be hereinafter described, the sprocket wheel 84 is restrained against rotational movement while the transfer arm assembly 2 moves through the arc X and the arc Z. The sprocket wheels 83 and 84 are sized so as to be of the same diameter. Thus, the sprocket wheel 83 will be caused to oscillate in a direction opposite to the direction of rotation of the arm assembly 2 while the arm assembly 2 moves through the arcs X and Z so as to maintain a carrier assembly 4 in parallel positions of alignment while it moves through the arc X and also in parallel positions of alignment while it moves through the arc Z in a reoriented orientation. The operation of this parallel motion mechanism, which is well understood in the art, is described in Rowe Patent 2,623,648.

The mechanism for effecting the reorienting of the article carrying assembly 4, while the transfer arm assembly 2 moves through the intermediate arc Y, is illustrated in detail in FIGURES 5, 11, 13, 14 and 15.

The reorienting mechanism includes a gear 88 mounted on the shaft 85 as shown in FIGURE 5. A second gear 89 meshingly engages the gear 88 and is mounted upon a shaft 90 which is rotatably mounted at each end in a bracket 91 which is secured to the housing 1 as shown in FIGURE 5 and FIGURE 13. For purposes of clarity, in the FIGURE 13 view of the cam and cam assembly, the gear 88 and its supporting shaft 85 are not shown.

A cam assembly is mounted on and carried with the toothed rack 32. This cam assembly includes a first cam 92 configured as shown in FIGURE 14. This cam includes an upwardly facing and transversely extending camming surface 92a and a vertically extending camming surface 92b. A second cam 93 is included in the cam assembly, which cam 93 is spaced from the first cam 92 along the axis of shaft 90 as shown in FIGURE 13. Cam 93 includes a downwardly facing and transversely extending camming surface 93a as well as a vertically extending surface 93b. Cams 92 and 93 may be fabricated from separate plate members and may be spaced by a spacer member S.

A cam follower assembly is mounted on the shaft 90 for oscillating movement with the gear 89. This cam follower assembly includes a first arm 94 extending radially from the shaft 90 and carrying a roller 95 rotatably mounted at its outer end. A second radial arm 96 extends radially from the shaft 90 at right angles to the arm 94, i.e. 90° displaced from the arm 94, and carries at its outer end a rotatably mounted roller 97. As shown in FIGURE 13, roller 97 which is adapted to function as a cam follower, cooperating with the cam 92, is mounted on the forward side of the arm 96 when viewing the apparatus as shown in FIGURE 13 while the roller 95 which is adapted to function as a cam follower cooperating with cam 93 is mounted on the rear side of the arm 94 when viewing the apparatus as shown in FIGURE 13. The cam followers 97 and 95 are displaced along the axis of oscillation of the follower assembly.

As shown in FIGURE 13, toothed rack 32 may be mounted upon a base plate 32a which also serves as a mounting vehicle for the cams 92 and 93 and the spacer S of the cam assembly. As illustrated, base member 32a is slideably supported in bracket 33 by means of conventional securing strips 98, 99, 100 and 101, which provide bearing surfaces to facilitate the sliding movement of the base member 32a.

The mode of cooperation of the cam assembly and the cam follower assembly is illustrated in FIGURES 14 and 15.

FIGURE 14 illustrates the manner in which the cam 92 cooperates with the cam follower 97 to effect rotation of the follower assembly during the upward movement of the toothed rack 32. As the rack 32 moves upwardly, the camming surface 92a will engage the roller 97 and cause the follower assembly to rotate clockwise, as shown in FIGURE 14, until the roller 97 clears the camming surface 92a. This clearance will result when the roller 97 has been moved to a position 97a adjacent the plane of the vertically extending cam surface 92b. The roller 97 will have assumed the position 97a, as shown in FIGURE 14, when the roller assembly has rotated 90° so as to have caused a corresponding 90° rotation of the shaft 90. This 90° rotation will be transmitted through the meshing gears 89 and 88 to the sprocket wheel 84 and, through the endless chain 86, will be then transmitted to the sprocket wheel 83 to effect a 90° rotation of the carrier assembly 4. Engagement of the cam surface 92a and the follower 97 to initiate the rotation of the gears 88 and 89 and thus the sprocket wheel 84 will occur when the frame axis of the transfer arm assembly 2 is aligned at position 20b and the transfer assembly is entering the arc Y representing the intermediate travel portion of the transfer arm assembly 2. When cam follower 97 assumes the position 97a, the frame axis of the transfer arm assembly will have assumed the position 20c at the end of the arc Y, so as to have effected a complete 90° reorientation of the carrier assembly 4. As will be appreciated, the magnitude of the arc Y will be governed by the slope of the camming surface 92a and the diameter relationships existing between the gears 88 and 89. As illustrated, gears 88 and 89 are of the same diameter, such that a 90° movement of the follower assembly, and thus the gear 89, is effective to induce a corresponding 90° increment of rotation of the gear 88, as well as the sprocket 84 and article carrier assembly 4.

As will be apparent, the 90° movement of the follower assembly on the upward stroke on the toothed rack 32 will be effective to induce a 90°, counterclockwise, reorienting movement of the article carrier assembly 4 while the transfer arm assembly 2 moves clockwise through the intermediate arc Y of its swinging movement.

FIGURE 15 illustrates the mode of cooperation between the roller follower 95 and the cam 93. At the end of the upward stroke of the toothed rack 32 the follower 95 will be disposed beneath the cam surface 93a with the arm 94 extending horizontally to the left when viewing the apparatus as shown in FIGURES 14 and 15. When the toothed rack 32 moves downwardly to effect the return or counterclockwise stroke of the transfer arm assembly 2, when viewing the apparatus as shown in FIGURES 2, 3 and 4, the camming surface 93a will engage the roller 95 to pivot the cam assembly counterclockwise. When the roller 95 has been pivoted to assume the solid line position shown in FIGURE 15, the follower assembly will have been moved through a 90° increment so as to be restored to the initial position as shown in FIGURE 14. At the end of this 90° increment, the roller 95 will have cleared the cam surface 93a so as to enable the vertical cam surface 93b to move slidingly by the roller 95.

The engagement of camming surface 93a and roller 95 on the downward stroke of the toothed rack 32, with the illustrated cam structure, will occur when the frame axis of the transfer assembly 2 has reached the position 20c on the return of counterclockwise stroke so as to enter the intermediate arc Y of its travel. When the cam assembly has been pivoted 90° counterclockwise by the cam surface 93a, and the roller 95 has assumed the position shown in FIGURE 15, the transfer assembly axis will have assumed the position 20b shown in FIGURE 3.

The initiation of the follower assembly rotation on the clockwise stroke of arm assembly 2 and the termination of follower assembly rotation on the counterclockwise stroke of arm assembly 2 in alignment with frame axis position 20b results from cam surfaces 92a, and 93a bearing a mirror image, although laterally displaced, relationship to each other, as shown. This relationship also causes the termination of follower assembly rotation on the clockwise stroke of arm assembly 2 and the initiation of follower assembly rotation on the counterclockwise stroke of arm assembly 2 to occur in alignment with frame axis portion 20c.

The 90° counterclockwise movement of the cam assembly, as effected by the cam 93 on the downward stroke of the toothed rack 32, is effective to impart a 90° reorientation to the article carrying assembly 4 through means of the interconnected gears 88 and 89, the shaft 85, the sprocket wheel 84, the endless chain 86 and the sprocket wheel 83. The counterclockwise rotation of the cam assembly will effect clockwise rotation of the article carrier assembly 4 during the counterclockwise movement of the transfer arm assembly 2 through the intermediate arc (Y), i.e. during the return stroke of the transfer arm assembly 2, when viewing the apparatus as shown in FIGURE 3.

As described, operable engagement between the cam assembly and the cam follower assembly occurs during the intermediate portion of travel of the transfer arm assembly 2. During the part of the swinging movement of the transfer arm assembly 2, when the assembly is moving through the arc X, in either direction, the cam follower assembly is prevented from rotating. This cam follower assembly, rotation prevention is accomplished by the slideable engagement of the vertical cam surface 93b with one side of the roller 95 and by engagement of the end of a threaded abutment 102 with the opposite side of the roller 95. Thus, cam surface 93b and the end of threaded abutment 102 cooperate to engage opposite sides of the follower 95 to restrain the follower assembly and thus prevent movement of the sprocket 84.

As shown in FIGURE 14, when roller 97 is engaged by camming surface 92a, follower 95 moves beyond the restraining surface 93b so that the follower assembly may rotate under the influence of the camming surface 92a.

When the transfer assembly 2 moves through the arc Z of its swinging movement in either direction, the follower assembly is again restrained so as to prevent movement of the sprocket wheel 84. This restraint results from sliding engagement of the cam surface 92b with one side of the roller 97, when it has assumed the position 97a, and engagement by the end of a threaded abutment 103 with the opposite side of this cam follower 97. Thus, the cam surface 92b and the abutment stop 103 cooperate to engage opposite sides of the follower 97 and thus prevent rotational movement of the follower assembly and, therefore, the sprocket 84.

From the foregoing, it will be seen that while the arm assembly 2 moves through the initial and terminal portions of its rotary strokes, the sprocket 84 will be held immobile to allow the parallel motion mechanism to govern the rotation of the carrier assembly 4. When the arm assembly 2 moves through the intermediate portions of its rotary stroke, the rotation of the carrier assembly 4 will be accelerated, under the influence of the cooperating cam and cam follower assemblies, to effect carrier assembly reorientation.

In order to adjust the transfer mechanism to particular environments of infeed conveyer elevation and outfeed conveyer elevation, it may be necessary to modify the positions of travel extremity of the transfer arm assembly 2. This is accomplished by the drive mechanism adjustment structure illustrated in FIGURES 11, 16 and 17.

As shown in FIGURES 11 and 17, the piston rod 40 is connected at one end to a pivot joint 42. Pivot joint 42 is mounted between the legs of a generally U-shaped adjustment member 104. Member 104 is secured to drive arm 43 by means of clamping bolts 105 and 106. Bolts 105 and 106 extend through a slot 107 formed in the drive arm 43, which slot extends transversely of the reciprocating direction of the piston rod 40. With this arrangement, the distance between the pivot joint 42 and the sector gear oscillation axis 36 may be selectively varied so as to modify the extent of oscillation of the transfer arm assembly 2, as induced by the sector gear 35, without changing the extent of reciprocation of the piston rod 40 or the position of pivot connection 41. Thus, by appropriately adjusting the position of the member 104 and thus the pivot joint 42, the terminal position of the swing of transfer arm assembly 2, i.e. the position adjacent the outfeed conveyer, may be varied to conform to the elevational requirement of that conveyer.

Adjustment of the swing initiating position of the transfer arm assembly 2 relative to the infeed conveyer may be effected by the mechanism illustrated in FIGURES 11 and 16. Such adjusting may be desired to compensate for or eliminate changes in arm swing initiating position caused by adjusting the position of pivot 42, or may be desired to change the swing initiating position to suit particular operating requirements.

A clamping bolt 108 is mounted on the sector gear 35 and passes through a slot 109 formed in the drive arm 43, as shown in FIGURES 11 and 16. Slot 109 may be curved so as to have a radius of curvature conforming to the distance between the slot and the oscillation axis 36 so as to facilitate relative rotational movement between the drive arm 43 and the sector gear 35 when the clamping bolt 108 is loosened. When the desired relative rotational positions of the drive arm 43 and the sector gear 35 have been obtained, their alignment may be preserved by appropriate adjustment of a threaded, abutment stop 110 and another threaded, abutment stop 111 followed by retightening of clamping bolt 108.

As shown in FIGURE 11, threaded abutment stop 110 is carried by the sector gear 35 and is adapted to engage a transverse surface on the drive arm 43 while the threaded abutment stop 111 is carried by the drive arm 43 and adapted to engage the bolt 108 which, in effect, comprises a portion of the sector gear 35. With this arrangement apparatus vibration which may tend to induce loosening of one of the abutment stops should not affect the other stop such that proper alignment between the sector gear 35 and the drive arm 43 would be at all times maintained.

As will be apparent, the article pick-up position of the transfer arm assembly 2 may be adjusted by merely changing the rotational position of the sector gear 35 with respect to the drive arm 43. By making this relative rotational adjustment between these components, the pickup position of the transfer arm assembly 2 may be varied without modifying the retracted position of the piston rod 40.

As is apparent, the described modes of adjustment of the extent of oscillation of the transfer arm assembly 2 do not affect the frame axis positions at which reorientation of the article carrier assembly 4 is commenced and terminated.

In describing the transfer mechanism of this invention and its characterizing structural features, the advantages attendant upon the invention have been made apparent.

A structurally simple, yet operationally reliable mechanism is provided for effecting the reorientation of articles during the intermediate portion of the swinging movement of a transfer mechanism, which orientation is effected in alignment with the plane of swinging movement of the transfer mechanism. In this manner, the lateral dimensions of the apparatus may be maintained at a minimum so that multiple article transfer and reorientation may be efficiently accomplished.

The transfer mechanism and reorientation mechanism are operated in response to the operation of a common drive unit. The necessity of providing separate drive mechanisms for the transfer mechanism and the article carrier reorientation device is avoided.

Inadvertent misalignment of the article carrying mechanism in the vicinity of either the infeed or outfeed conveyers is prevented by a unique, highly effective, yet structurally simple mechanism for locking the cam follower in its terminal positions.

The terminal positions of the oscillating strokes of the transfer mechanism may be effectively adjusted so as to accommodate the mechanism to a wide range of environmental conditions of infeed and outfeed conveyer elevations. In making such adjustments of the terminal positions of the oscillating strokes of the transfer means, the portion of the oscillation strokes during which article reorientation occurs remains unchanged.

Because of the character of the described reorientation mechanism, the apparatus may be readily converted to a parallel motion type of operation with only nominal changes being made in the operating components. For example, by merely removing the cam and cam follower and rendering the gears 88 and 89 inoperative, the apparatus may be converted to a mechanism for moving articles such that throughout the movement operation the articles are maintained parallel to their initially received position.

The structural character of the disclosed reorienting mechanism particularly facilitates the conversion of an endless chain type of parallel motion transfer mechanism to an article reorienting mechanism as herein disclosed.

While the invention has been described with reference to a preferred embodiment, it will be apparent to those skilled in the art that additions, deletions, substitutions or modifications in the disclosed structure may be made which would be within the purview of the invention as defined in the appended claims.

We claim:

1. An article transfer mechanism, said mechanism comprising:

transfer means mounted for oscillating movement;

article carrying means mounted on said transfer means and spaced from the oscillation axis thereof, said article carrying means being mounted for oscillation about an axis parallel to the oscillation axis of said transfer means;

drive means for oscillating said transfer means;

first, article position governing means connected with said transfer means and said article carrying means and automatically operable in response to the initial portion of the rotating movement of said transfer means in one direction and in response to the terminal portion of the rotating movement of said transfer means in the opposite direction to rotate said article carrying means relative to said transfer means so as to cause said article carrying means to remain substantially parallel to its initial position; and second, article position governing means connecting said drive means with said first article position governing means and automatically operable in response to operation of said drive means to cause said first article position governing means to rotate and reorient said article carrying means to a position inclined relative to its initial position while said transfer means moves through an intermediate portion of said rotating movement in one direction and to counter rotate said article carrying means to restore it from its reoriented position to a position parallel to its initial position while said transfer means moves through an intermediate portion of said rotating movement in the opposite direction;

said first article position governing means being automatically operable in response to the terminal portion of said rotating movement of said transfer means in said one direction and the initial portion of the rotating movement of said transfer means in the opposite direction to maintain said article carrying means parallel to its reoriented position.

2. A mechanism as described in claim 1 wherein said second article position governing means comprises:
article position governing, gear means operably connected with said first article position governing means;
a cam follower assembly mounted for pivotal movement, said cam follower assembly being drivingly connected with said article position governing, gear means and including;
a first follower radially spaced from the pivot axis of said follower assembly, and
a second follower radially spaced from the pivot axis of said follower assembly,
a cam assembly mounted for reciprocating movement, said cam assembly including;
a first cam adapted to engage said first follower while said cam assembly moves in one direction so as to effect rotation of said follower assembly and, through means of said article position governing, gear means, rotation of said article carrying means, and
a second cam adapted to engage said second follower while said cam assembly moves in a direction opposite to said one direction so as to effect rotation of said article position governing, gear means in a direction opposite to that caused by engagement of said first cam and said first follower, and
abutment means for preventing movement of said follower assembly beyond predetermined limits.

3. A mechanism as described in claim 1 wherein; said drive means comprises;
drive gear means rigidly mounted on said transfer means coaxial with the axis of oscillation of said transfer means; and
toothed rack means engaging said drive gear means and mounted for reciprocating movement so as to effect oscillation of said drive gear means and said transfer means;
said first, article position governing means comprises;
first sprocket wheel means mounted on said transfer means for oscillation with said article carrying means;
second sprocket wheel means mounted on said transfer means so as to be coaxial with the axis of oscillation of said transfer means; and
sprocket chain means interconnecting said first sprocket wheel means and said second sprocket wheel means;
said second sprocket wheel means being restrained against rotational movement about its axis during said initial and terminal portions of said rotating movements of said transfer means; and
said second article position governing means comprises;
article position governing, gear means operably connected with said second sprocket wheel means;
a cam follower assembly mounted for pivotal movement, said cam follower assembly being drivingly connected with said article position governing, gear means and including
a first follower radially spaced from the pivot axis of said follower assembly, and
a second follower radially spaced from the pivot axis of said follower assembly,
said first follower and said second follower being displaced along the pivot axis of said follower assembly;
a cam assembly carried by said toothed rack means, said cam assembly including;
a first cam adapted to engage said first follower while said toothed rack means moves in one direction so as to effect rotation of said follower assembly and, through means of said article position governing, gear means, rotation of said second sprocket wheel means, and
a second cam adapted to engage said second follower while said toothed rack means moves in a direction opposite to said one direction so as to effect rotating of said article position governing, gear means in a direction opposite to that caused by engagement of said first cam and said first follower; and
abutment means for preventing movement of said follower assembly beyond between predetermined limits.

4. A mechanism as described in claim 3 wherein: said first cam and second cam each includes:
a cam surface disposed transverse to the direction of rack means reciprocation, and
a cam follower, restraining surface disposed parallel to the direction of rack means reciprocation,
said follower assembly includes:
a first radial arm carrying at its outer end a first roller comprising said first follower, and
a second radial arm carrying at its outer end a second roller comprising said second follower, said first radial arm and said second radial arm having their radial axes intersecting their respective axes of roller rotation and being displaced 90° about the pivot axis of said follower assembly;
said abutment means includes:
a first abutment stop adapted to engage one radial arm of said follower assembly, and
a second abutment stop adapted to engage the other radial arm of said follower assembly whereby said follower assembly is restrained to oscillate through a 90° arc; and
said article position governing, gear means includes:
a first gear coaxial with and operably connected with said second sprocket wheel means, and
a second gear coaxial with and operably connected with said follower assembly.

5. A mechanism as described in claim 4 wherein: the restraining surface on said first cam and said first abutment stop cooperate to engage opposite sides of said first roller during the terminal portion of said rotating movement of said transfer means in one direction and the initial portion of said rotating movement of said transfer means in the opposite direction to prevent rotational movement of said follower assembly, and
said second cam and said second abutment stop cooperate to engage opposite sides of said second roller during the initial part of said rotating movement of said transfer means in one direction and the terminal portion of said rotating movement of said transfer means in the opposite direction so as to prevent rotational movement of said follower assembly.

(References on following page)

References Cited by the Examiner

UNITED STATES PATENTS

| | | | |
|---|---|---|---|
| 1,740,575 | 12/1929 | Clausen. | |
| 1,869,622 | 8/1932 | Rowe. | |
| 2,072,826 | 3/1937 | Riley | 214—134 X |
| 2,696,918 | 12/1954 | Arelt. | |
| 2,697,529 | 12/1954 | Hubbell. | |
| 2,739,484 | 3/1956 | Orr | 74—99 |
| 2,832,478 | 4/1958 | Malewicz. | |
| 2,954,754 | 10/1960 | Flick | 74—99 |
| 2,972,897 | 2/1961 | Reddi | 74—99 |

HUGO O. SCHULZ, *Primary Examiner.*